R. P. RUTLEDGE & R. G. BOLAND.
HARROW TOOTH.
APPLICATION FILED AUG. 27, 1912.
1,061,570.
Patented May 13, 1913.
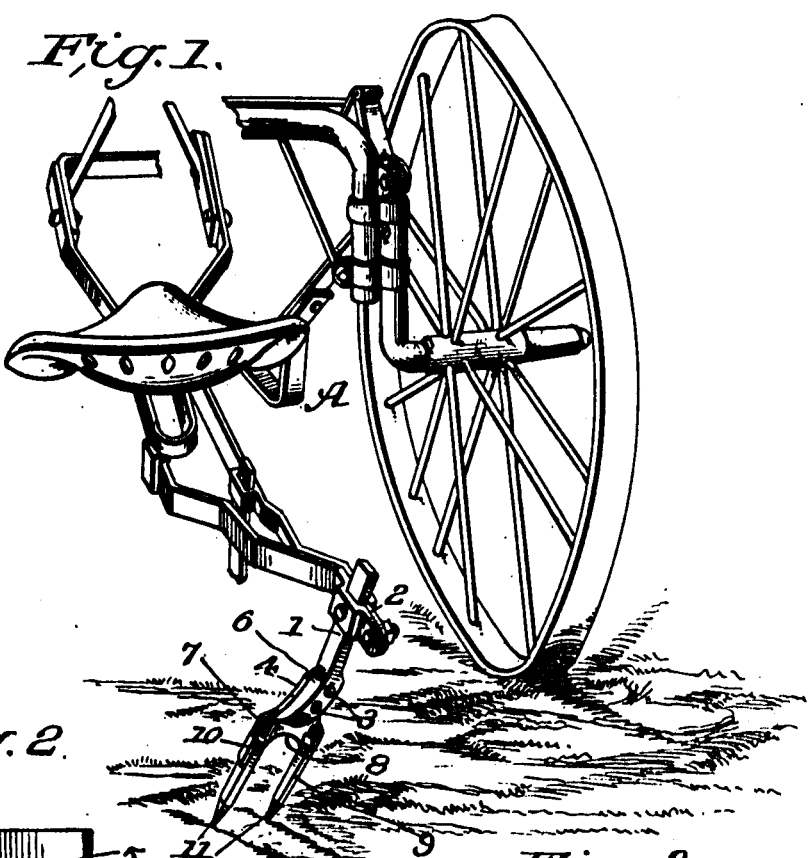
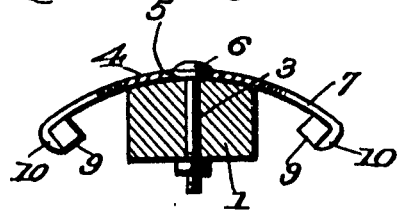
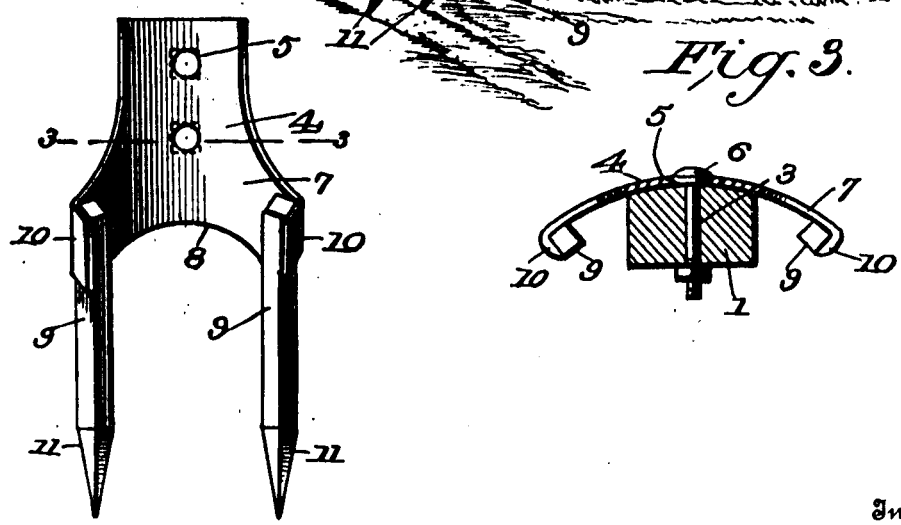
Inventor
R. P. Rutledge
R. G. Boland

UNITED STATES PATENT OFFICE.

ROBERT P. RUTLEDGE AND RANDSOME G. BOLAND, OF SCRANTON, TEXAS.

HARROW-TOOTH.

1,061,570.   Specification of Letters Patent.   Patented May 13, 1913.

Application filed August 27, 1912. Serial No. 717,403.

*To all whom it may concern:*

Be it known that we, ROBERT P. RUTLEDGE and RANDSOME G. BOLAND, citizens of the United States, residing at Scranton, in the county of Eastland and State of Texas, have invented certain new and useful Improvements in Harrow-Teeth, of which the following is a specification.

This invention relates to harrow teeth and has as its object to provide a harrow tooth so constructed that by its use furrow crusts may be more effectually broken than by teeth now used for this purpose.

Another aim of the invention is to provide a harrow tooth so constructed that it will not be liable to injure the growing plants but will thoroughly break the crust of the furrow at each side of the row of plants.

For a full understanding of the invention reference is to be had to the following description and accompanying drawing, in which:—

Figure 1 is a perspective view of the harrow tooth embodying the present invention. Fig. 2 is a rear elevation thereof. Fig. 3 is a horizontal sectional view through the same on line 3—3 of Fig. 2.

Corresponding and like parts are referred to in the following description and indicated in all the views of the drawing by the same reference characters.

In the drawing the reference character A indicates in general a portion of an ordinary riding cultivator or harrow upon the beams of which are to be mounted the harrow teeth embodying the present invention. The supporting standard for each tooth is indicated in the drawing by the numeral 1 and is clamped to the beam in the same manner as is the standard of an ordinary cultivator shovel, as shown at 2 in Fig. 1 of the drawing. Near its lower end the standard 1 is formed with openings 3 for the passage of bolts which are designed to secure the tooth shank to the standard, as will be presently pointed out. The shank of the tooth is in the form of a plate 4 having openings 5 through which and the openings 3 are passed bolts 6, these being the bolts above referred to as securing the tooth shank to its standard. As will be observed from inspection of Fig. 3 of the drawing the shank of the tooth is transversely curved and has its convex side presented forwardly it being provided at its lower end with wings 7 which project laterally and downwardly in opposite directions and which are curved in the same arc as the body-portion of the shank. The lower edge of the shank and its wings 7 are curved substantially on the arc of a circle, as indicated at 8 so that the shank will straddle the ridge of a furrow through which the teeth are drawn.

The teeth proper are indicated by the numeral 9 and as illustrated in the several figures of the drawing, a pair of these teeth is supported by each of the shanks 4. The upper end of each tooth is welded, or otherwise secured to the rear side of one of the wings 7 and the outer end portion of the wing is bent to extend rearwardly and downwardly as at 10 so as to embrace one side or face of the tooth at its upper end, the adjacent portion of the wing embracing the adjacent forwardly presented side or face of the tooth, as shown in Fig. 3 of the drawing.

It will be observed from inspection of Fig. 3 that the teeth are square in cross-section and that they are so disposed and supported by the shank that each will have one of its edges between the adjacent faces, presented forwardly. The lower end of each tooth is tapered and is preferably substantially of pyramidal form, as indicated at 11.

From the foregoing description of the invention it will be seen that there is provided a harrow tooth which may be readily applied to any ordinary cultivator or harrow frame and which, while substantial in construction and capable of resisting shocks, will be to a certain extent, resilient, due to the curvature given the shank and its wings, it being observed from inspection of Fig. 3 of the drawing that the standard 1 is of less width than the said shank at its wings 7 so that the wings are free to yield in a rearward direction, to a slight degree, as the teeth 9 are passing through a furrow, the crust of which is to be broken.

Having thus described the invention what is claimed as new is:—

1. A device of the class described, comprising a shank having wings extending laterally in opposite directions therefrom, and a tooth carried by each wing.

2. A device of the class described, comprising a shank having wings extending laterally in opposite directions therefrom and curved to extend downwardly and rearwardly, and a tooth projecting downwardly from each wing.

3. A device of the class described, comprising a shank having wings extending laterally in opposite directions therefrom, and a tooth carried by each wing, each tooth being rectangular in cross-section and having an edge presented forwardly.

4. A device of the class described, comprising a shank having wings extending laterally in opposite directions therefrom, and a tooth carried by each wing, each tooth being rectangular in cross-section and having an edge presented forwardly, the teeth at their lower ends being of pyramidal form.

5. A device of the class described, comprising a shank formed from a plate having wings extending laterally in opposite directions therefrom, the said plate and the wings being transversely curved with their convex sides presented forwardly, and a tooth supported at the outer end of each wing and projecting downwardly therefrom.

In testimony whereof we affix our signatures in presence of two witnesses.

ROBERT P. RUTLEDGE. [L. S.]
RANDSOME G. BOLAND. [L. S.]

Witnesses:
J. A. REYNOLDS,
F. S. BOLAND.

Copies of this patent may be obtained for five cents each, by addressing the "Commissioner of Patents, Washington, D. C."